May 6, 1952  J. P. BUTTERFIELD  2,595,761
CRANKSHAFT
Filed March 24, 1948
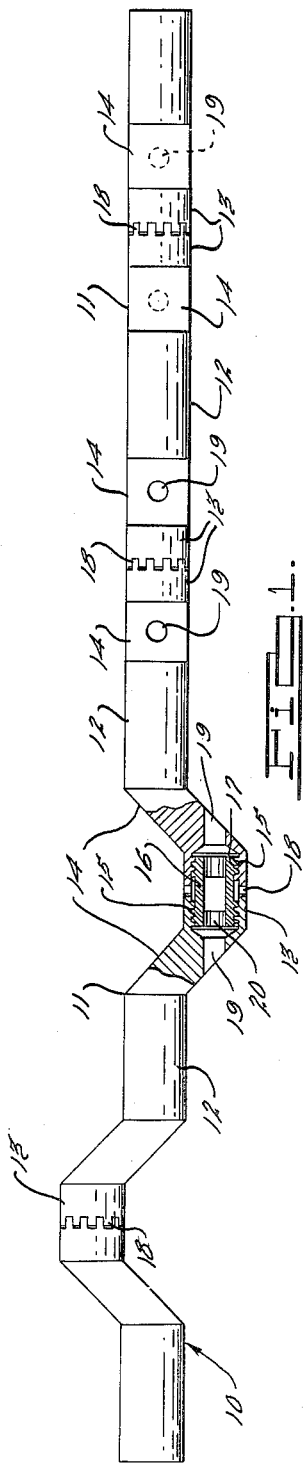
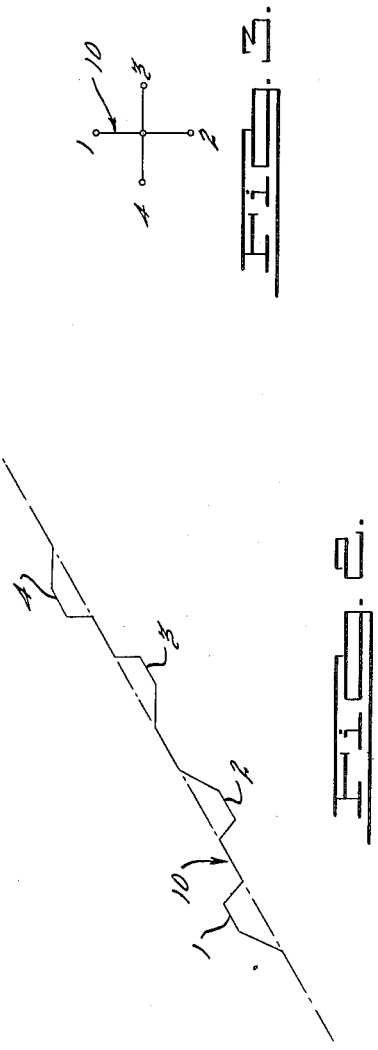
INVENTOR.
John P. Butterfield
BY
Harness & Harris
ATTORNEYS.

Patented May 6, 1952

2,595,761

UNITED STATES PATENT OFFICE 2,595,761

CRANKSHAFT

John P. Butterfield, Grosse Pointe Woods, Mich., assignor to Chrysler Corporation, Highland Park, Mich., a corporation of Delaware Application March 24, 1948, Serial No. 16,646

2 Claims. (Cl. 74—597)

My invention relates to improvements in crankshafts adapted for use in engines and the like. Although my improved crankshaft is capable of use to advantage in a variety of types of engines and compressors, it is especially advantageous in connection with the engine shown in the copending application of Alexander G. Herreshoff, Serial No. 16,801, filed March 24, 1948, inasmuch as the assembly of such engine is facilitated by a crankshaft structure of the general type provided by my invention.

It is an object of my invention to provide an improved crankshaft structure of the built-up or sectional type in contrast with the more conventional crankshafts forged as a unitary structure.

Another object is to provide a built-up crankshaft having improved strength, simplicity of manufacture and assembly, and capable of being manufactured at low cost.

Further objects and advantages of my invention will be apparent from the following detailed description of one form of my invention, reference being made to the accompanying drawings in which:

Fig. 1 is a side elevational view of my crankshaft, parts being broken away;

Fig. 2 is a diagrammatic perspective view of the Fig. 1 crankshaft; and

Fig. 3 is an end view of the Fig. 2 crankshaft.

In the drawings reference character 10 designates the crankshaft structure formed in a plurality of sections 11. Each mounting or journal section 11 is composed of a central axial section 12, offset crank-forming end portions 13 displaced from the axial section, and diagonally extending portions 14 connecting the offset portions 13 and the axially extending journal portion 12. The offset portions 13 are hollow in that they are provided with openings in which internal threads 15 are formed. The internal thread 15 on one offset portion 13 of one crankshaft section 11 is left hand, and the internal thread 15 of the offset portion of the end immediately adjacent on the next crankshaft section 11 is right hand. The adjacent offset portions 13 on adjoining crankshaft sections 11 are joined by a tubular member 16 having external threads 17 right hand at one end and left hand at the other end, engaging the internal threads 15. Thus the member 16 bridges the hollow portions of the adjacent crank portions 13 and threadedly connects the internal surfaces of these hollow portions. The ends of adjacent offset portions are provided with interengaging serrations or teeth 18, which properly rotatably index the crankshaft sections 11 with respect to one another in predetermined relationship and serve to connect the adjacent sections rigidly together. The adjacent offset portions 13 are drawn into engagement with one another by rotation of the tubular member 16 engaging these offset portions. The diagonal crankshaft portions 14 are provided with openings 19, through which a tool may be inserted into engagement with internal flutes 20 at the ends of the tubular member 16 in order to rotate the latter.

My crankshaft structure is of particular advantage in facilitating assembly of an operating element, such as a bearing block, directly to the crank portion 13 where such element is of the type having a continuous or non-split bearing for connection to the crank as in the aforesaid Herreshoff application.

In Figs. 2 and 3 I have illustrated a preferred arrangement of crank throws for a four-crank crankshaft constructed in accordance with my invention. Obviously my crankshaft may be constructed with any desired number of throws arranged in any desired relative angular relationship with each other. In Figs. 2 and 3 the throws is sequence are numbered 1, 2, 3, and 4. Throws 1 and 2 are in the same plane but are 180° apart. The same is true of throws 3 and 4 and the plane of these throws is 90° from that of throws 1 and 2.

I claim:

1. A rod or shaft connection for a pair of detachably connectible shaft sections comprising aligned axially extending bores through the shaft sections, the bore in one shaft section including a right handed, internally threaded, portion and the bore in the other shaft section including a left handed, internally threaded portion, mating toothed segments on the engageable end faces of the shaft sections matingly engaged to prevent relative rotation between said shaft sections, and a tubular shaft section connecting member adapted to be mounted wholly within and extending between the bores in the connectible shaft sections, said connecting member having externally formed, right hand and left hand threaded portions adapted to be engaged with the oppositely threaded portions of the bores of the connectible shaft sections, and tool gripping formations within the opposite ends of the connecting member to facilitate rotation thereof.

2. A built-up crankshaft comprising a pair of adjacent, connected crankshaft sections each section being formed as an integral unit and including an axially extending journal portion, a connecting portion projecting from an end of the journal portion and extending substantially transversely thereof, and an axially extending, crank portion projecting from the outwardly extending end of the connecting portion and offset from said journal portion, the crank portions of the connected crankshaft sections being arranged with the exposed ends thereof in aligned, contacting relationship, said crank portions each having an axially extending opening therethrough provided with internally formed threads, the threads in the openings of adjacent contacting crank portions being of opposite hands, and the exposed ends of adjacent crank portions each including axially extending, engaged, mating teeth, and an externally threaded crank portion joining member mounted wholly within and extending through the axially extended openings in the contacting crank portions having threaded portions of opposite hands engaged with the internally threaded openings of the adjacent crank portions to connect the sections of the crankshaft in aligned rigidly assembled relationship, said joining member including integrally formed, recessed means to facilitate rotation of the joining member.

JOHN P. BUTTERFIELD.

REFERENCES CITED

The following references are of record in the file of this patent:

UNITED STATES PATENTS

| Number | Name | Date |
|---|---|---|
| 970,172 | Bloom et al. | Sept. 13, 1910 |
| 1,415,658 | Lane | May 9, 1922 |
| 1,613,835 | Kasper | Jan. 11, 1927 |
| 1,901,286 | Coe | Mar. 14, 1933 |
| 2,225,451 | Hirth | Dec. 17, 1940 |
| 2,340,458 | Dusevoir | Feb. 1, 1944 |

FOREIGN PATENTS

| Number | Country | Date |
|---|---|---|
| 11,613 | Great Britain | May 4, 1905 |
| 606,017 | France | June 5, 1926 |
| 668,293 | France | Apr. 30, 1928 |
| 486,491 | Great Britain | June 3, 1938 |
| 370,815 | Italy | May 2, 1939 |